United States Patent
Perlman et al.

(10) Patent No.: US 12,045,629 B2
(45) Date of Patent: Jul. 23, 2024

(54) SECURELY CONFIGURING TARGET DEVICES USING DEVICE IDENTITY

(71) Applicant: Microsoft Technology Licensing, LLC, Redmond, WA (US)

(72) Inventors: Brian S. Perlman, Bothell, WA (US); Yanan Zhang, Bellevue, WA (US); Manoj Jain, Redmond, WA (US); Helen Harmetz, Seattle, WA (US); Hung M. Dang, Seattle, WA (US); Michael Sean Kirby, Redmond, WA (US); Abigail Christine Motley, Seattle, WA (US); Padmanabhan Vasu, Seattle, WA (US); William Saunders Jack, III, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 516 days.

(21) Appl. No.: 16/797,584

(22) Filed: Feb. 21, 2020

(65) Prior Publication Data
US 2021/0096881 A1    Apr. 1, 2021

Related U.S. Application Data

(60) Provisional application No. 62/908,428, filed on Sep. 30, 2019.

(51) Int. Cl.
*G06F 9/44*        (2018.01)
*G06F 9/445*       (2018.01)
(Continued)

(52) U.S. Cl.
CPC ........ *G06F 9/44505* (2013.01); *G06F 16/252* (2019.01); *H04L 41/0876* (2013.01); *H04L 63/0876* (2013.01)

(58) Field of Classification Search
CPC ..................................... G06F 1/32; G06F 9/44
See application file for complete search history.

(56) References Cited

U.S. PATENT DOCUMENTS 7,143,287 B2    11/2006  Bade et al.
8,245,934 B1 *   8/2012  Tam .................... G06F 9/44505
                                          235/462.11
(Continued)

OTHER PUBLICATIONS

"5 Appendix A: Product Behavior", Retrieved From: https://docs.microsoft.com/en-us/openspecs/windows_protocols/ms-lcid/a9eac961-e77d-41a6-90a5-ce1a8b0cdb9c?redirectedfrom=MSDN, Mar. 13, 2019, 44 Pages.

(Continued)

*Primary Examiner* — Keshab R Pandey
(74) *Attorney, Agent, or Firm* — Rainier Patents, P.S.

(57) ABSTRACT

This document relates to a process for deploying devices and automatically provisioning the devices to connect to a managed network upon powering on with minimal user involvement. Upon deployment of the device to an end point, a record can be established in a management server regarding the device, which can associate device specifications with a deployment profile to be used in provisioning the device. Upon powering on of the device at the end point, the device can automatically perform attestation with the management server, which can then provision the device according to the deployment profile without additional user intervention.

20 Claims, 6 Drawing Sheets

(51) Int. Cl.
    *G06F 16/25*     (2019.01)
    *H04L 9/40*     (2022.01)
    *H04L 41/08*     (2022.01)

(56) References Cited

U.S. PATENT DOCUMENTS

| | | | |
|---|---|---|---|
| 9,490,984 B2 | 11/2016 | Leicher et al. | |
| 9,819,661 B2 | 11/2017 | Stern | |
| 10,009,179 B2 | 6/2018 | Acar et al. | |
| 10,075,385 B1* | 9/2018 | Thompson | G06F 9/45504 |
| 10,320,571 B2 | 6/2019 | Thom et al. | |
| 2009/0031008 A1* | 1/2009 | Elliott | H04L 67/14 |
| | | | 709/220 |
| 2010/0205281 A1* | 8/2010 | Porter | H04L 41/12 |
| | | | 370/254 |
| 2011/0071656 A1* | 3/2011 | McKiel, Jr. | G06N 5/02 |
| | | | 706/54 |
| 2011/0083169 A1* | 4/2011 | Moeller | H04L 63/0853 |
| | | | 726/5 |
| 2014/0173586 A1* | 6/2014 | Dugan | G06F 8/65 |
| | | | 717/173 |
| 2019/0149405 A1* | 5/2019 | Verma | H04L 41/0893 |
| | | | 709/222 |
| 2019/0180098 A1* | 6/2019 | Carpenter | G06F 40/186 |
| 2019/0244584 A1* | 8/2019 | Fujita | H04N 21/43635 |

OTHER PUBLICATIONS

"Available languages for Windows", Retrieved From: https://docs.microsoft.com/en-us/windows-hardware/manufacture/desktop/available-language-packs-for-windows#supported-language-packs-and-language-interface-packs, Nov. 28, 2018, 11 Pages.

"Microsoft API and Reference Catalog", Retrieved From: https://web.archive.org/web/20181121172019/https://msdn.microsoft.com/library?url=/library/en-us/intl/nls_238z.asp, Nov. 21, 2018, 3 Pages.

"TPM Usage", Retrieved From: https://web.archive.org/web/20130308013325/https:/www.chromium.org/developers/design-documents/tpm-usage, Mar. 8, 2013, 5 Pages.

Berdy, Nicole, "Device provisioning: Identity attestation with TPM", Retrieved from https://azure.microsoft.com/en-us/blog/device-provisioning-identity-attestation-with-tpm/, Nov. 7, 2017, 8 Pages.

Halfin, et al., "Provisioning CSP", Retrieved From: https://docs.microsoft.com/en-us/windows/client-management/mdm/provisioning-csp, Jun. 26, 2017, 2 Pages.

Ondrusek, et al., "Configure Windows Update for Business", Retrieved From: https://docs.microsoft.com/en-us/windows/deployment/update/waas-configure-wufb, Oct. 24, 2019, 15 Pages.

Satran, et al., "Windows Information Protection (WIP)", Retrieved From:https://docs.microsoft.com/en-us/windows/uwp/enterprise/wip-hub, Feb. 8, 2017, 5 Pages.

"Application as Filed in U.S. Appl. No. 16/358,582", filed Mar. 19, 2019, 39 Pages.

\* cited by examiner

100

200

SECURELY CONFIGURING TARGET DEVICES USING DEVICE IDENTITY

CROSS-REFERENCE TO RELATED APPLICATIONS

This application claims the benefit of U.S. Provisional Patent Application No. 62/908,428, filed Sep. 30, 2019, the entire contents of which are hereby incorporated by reference.

BACKGROUND

In certain public environments, devices may be provided that are intended to be utilized and shared by members of the public to do various tasks. For example, a hotel may have computers provided in a business center, or an airport may have computer kiosks that can be utilized by travelers for checking flight information. Deployment and management of such shared devices can require extensive Information Technology (IT) investments, and can often be overly complicated for users who are not technologically savvy. As such, there remain difficulties in deploying shared devices in a convenient manner.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
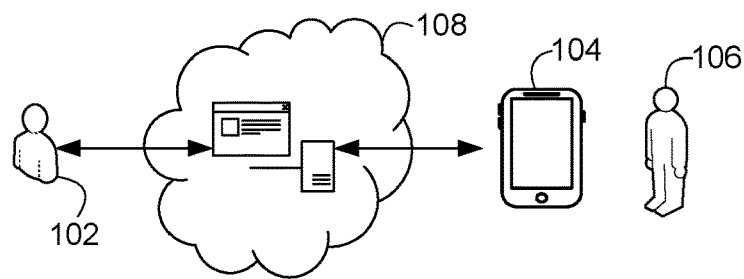
FIG. 1 illustrates an example environment that is consistent with some implementations of the present concepts.

Deployment of devices in a managed networking environment can often require extensive involvement by an IT administrator of an organization that operates the managed network. Because the IT administrator often has to appropriately configure each deployed device for proper access to the managed network for the organization, a large-scale deployment of devices may be difficult and time consuming. In certain implementations, provisioning packages can be loaded onto the device at the device end point, which can assist with configuration of the device. Such provisioning packages can be loaded on the device via external hardware, such as by a USB device, and the provisioning software can be run to configurate the device at the end point. However, the loading of the provisioning packages by way of external hardware can still require the involvement of a user at the device in order to appropriately load the hardware and its associated provisioning package, which reduces the convenience of device deployment.

Furthermore, while certain provisioning packages can be automatically downloaded and installed, such as via the managed network associated with an organization, the device may still require the IT administrator or other such user associated with the organization to provide the necessary network settings that enable the device to access the managed network. That is, in certain implementations, an IT administrator can determine the appropriate device characteristics before allowing the device to access the managed network, for purposes of ensuring that only authorized devices access the network.

For example, in one implementation, an organization may be an airport that maintains a managed network of airport kiosks. In order to ensure that malicious devices are not introduced into the managed network, a management server associated with the network may perform attestation of the kiosks by way of security identifiers associated with the kiosks. In one implementation, a Trusted Platform Module (TPM) associated with each of the kiosks may be utilized to securely identify the device. However, in order to appropriately enroll a newly deployed kiosk into the managed network, an IT administrator or other such user typically may be present at the initial installation of the device, as the appropriate device characteristics (such as a TPM identifier or other such security identifier) may be unknown to a management server that manages the network. Thus, a user may still be necessary in order to enter the device characteristics into the management server to allow the management server to recognize the device for attestation. Because user involvement may still be required at the device in order to appropriately provide the security identifier to the management server, deployment of multiple devices can be slow and inconvenient.

As such, in certain implementations, devices can be deployed according to a zero-touch deployment structure, whereby the devices can be setup and configured to operate with a managed network during the out-of-box experience in a fully automated manner without requiring any manual intervention by an end user, with the exception of powering on the device and connecting it to an Internet connection (i.e., a wired or wireless connection). Moreover, devices can be purchased and shipped directly to an end point where the device may be utilized, and a configuration profile can be stored on the cloud so as to be accessible by the device upon powering on at the end point. The accessing of a configuration profile may be permitted following attestation of the newly powered-on device with a management server associated with the managed network.

In one implementation, attestation of the device can be performed automatically by comparing a device identifier associated with the new device to data stored at the management server that specifies trusted devices. Upon receiving a request from the new device to join the managed network, the management server can request that the device prove that a security identifier associated with the device matches the identifier recorded by the management server. Once this security attestation is successful, the device can be automatically configured to receive any necessary network policies and settings according to the configuration profile without requiring additional involvement by a user at the end point.

Moreover, the management server may store a plurality of device identifiers corresponding to devices that are pre-approved for access to the managed network. That is, the management server may have a listing of devices that an IT administrator anticipates as joining the managed network, and upon powering on of any of the devices, the management server can perform secure attestation to confirm that the device is a device that was pre-registered with the management server. Upon securely identifying the device based on matching device characteristics with the information stored by the management server, the newly powered-on device can be permitted to join the managed network.

In one example use scenario, an IT administrator may desire to provide devices to an end point, such as an airport that may utilize the devices to allow travelers to check travel information. The IT administrator may issue a purchase order to purchase the device that is intended to be deployed from a device manufacturer, such as an original equipment manufacturer (OEM) or a reseller associated with the OEM, which for purposes of this disclosure will be referred to collectively as an OEM. Upon processing the purchase order, the OEM may generate a purchase order ID regarding the purchase, and ship the purchased device directly to the desired end point.

Based on the purchased device, the OEM can generate a computer build report (CBR) containing device specifications associated with the purchased device. Such device specifications may include a number of different types of data associated with the device, such as the OEM name who built the device, a device model name, a device serial number, a device 4K hardware hash, and/or a management service identifier, such as a tenant ID. The device 4K hardware hash can be a hash value that may contain several details about the device, including its manufacturer, model, device serial number, hard drive serial number, and many other attributes that can be used to uniquely identify that device in a single hash value. However, while the 4 k hardware hash can be used to identify the device, a tuple of information can also be used to identify the device. In some implementations, the tuple may consist of the OEM name, the device model name, and that device serial number, which can be used to uniquely identify a device.

In certain implementations, the CBR can be directly uploaded to the management server by the OEM, thereby automatically registering the purchased device in the managed network. For example, the IT administrator may issue a purchase order fora new device, and can then provide a particular management service identifier to the OEM. In some implementations, the management server identifier may be a tenant ID, which can be used to identify a particular tenant of a directory service, such as Microsoft Azure Active Directory, or Amazon Web Services Identity and Access Management, among other identity management software. The OEM can then upload the CBR to the management server according to the management service identifier, and the purchased device can automatically be associated with the purchasing organization for inclusion in the managed network. Based on the uploaded data, the management server can link the management service identifier, such as the tenant ID, with a device 4 k hardware hash. The OEM can then ship the device to the end point, and upon powering on of the device, the device can automatically connect to the management server to perform attestation.

Alternatively, if the OEM does not directly upload the CBR to the management server, the IT administrator can instead receive the CBR from the OEM, and personally upload the CBR to the management server, along with an ownership claim for the device, in order to enroll the device in the managed network. This ownership claim can therefore link the device represented by the CBR with the particular organization's account in the management server, such as by way of the management service identifier.

In certain implementations, the IT administrator can subscribe to notifications that can alert the administrator when the organization's management server identifier is associated with a CBR at the management server. For example, each time the OEM uploads a CBR linked to the management server identifier, the IT administrator may receive a notification indicating that a device is awaiting approval for permission to be pre-approved to join the managed network upon powering on of the device. Furthermore, by knowing in advance what specific computers may be requesting permission to join the managed network in the future, the IT administrator can adjust deployment profiles for specific devices if so desired.

As a result, the management server can know, in advance, that the device may have been approved for access to the managed network based at least on the registration of the device by the OEM and the pre-approval of the device by the IT administrator. Because the management server already has device specifications (including the security identifier) associated with that device based on the CBR, the management server can compare these device specifications to what is received from the powered-on device. More specifically, upon powering on of the device at the end point, the management server can require that the device provide its security identifier, and can compare the received security identifier with the stored security identifier associated with the CBR to confirm that the device is indeed the device which was pre-approved to join the managed network. Once the device confirms its identity, a deployment profile can then be provided to the device to complete enrollment of the device in the managed network automatically.

Thus, the only steps that may be required of a user at the device end point is to simply power on the device. In certain implementations, the device may automatically attempt to acquire access to a wired or wireless connection, such as by detecting an unsecured wireless signal. However, in instances where there is no detected network availability, the user may ensure that the device is connected to a wired or wireless network, such as by simply connecting an ethernet cable to the device.

The IT administrator can create a deployment profile for the devices, which may specify certain configuration settings for setting up the devices upon powering on at the end point. For example, the configuration profile may specify default languages, keyboard settings, personal assistant settings (such as the use of Microsoft Cortana), along with specific device management policies that can be enforced on the device. The configuration profile can then be associated with the devices (e.g., in the instance that all devices should be configured exactly the same), or certain configuration profiles may be uniquely associated with a particular device, such as by use of a particular device identifier. The deployment profile can then be stored on the management server for access by the device upon powering on of the device, following attestation.

As a result of the configuration profiles being created and stored in the cloud, an end user can receive the device as provided by either the OEM or the organization in charge of the managed network, and simply can power on the device and ensure that network access is available (e.g., such as by connecting an Ethernet cable to the device). Upon powering on, the security identifier associated with the device may be checked against the management service, and following attestation of the device, a deployment profile for the device may be accessed and the device can apply the deployment profile to begin automated configuration of the device. Furthermore, during configuration of the device, information regarding the organization that deployed the device can be displayed on a display of the device, such as a splash screen depicting the name of the organization, along with current installation and configuration statuses. Due to the automatic configuration of the device, multiple devices can be deployed and each can be setup in parallel with minimal involvement, as each of the devices will follow the deployment profile associated with the devices.

FIG. 1 depicts an example environment 100 for deploying devices. As depicted in FIG. 1, an IT administrator 102 associated with an organization may wish to deploy a device 104 for use by a user 106 at an end point. IT administrator 102 can create a deployment profile associated with device 104, which can be used to automatically configure device 104 with minimal involvement by user 106. Device 104 can be shipped directly to user 106 at the end point. In some implementations, users 106 may only need to power on device 104, and ensure that a network connection is available for device 104.

The deployment profiles may be stored on a management server 108, which may be a cloud-based enterprise management system, such as Microsoft Intune or AWS Marketplace, among other enterprise mobility management software. Upon powering on and connection of device 104 to a network, such as the Internet, a particular deployment profile for the device can be downloaded from management server 108, and the deployment profile may automatically configure the device for use by user 106. It is to be appreciated that while FIG. 1 depicts a single device, there may be multiple deployable devices that IT administrator 102 may wish to deploy.

Once the deployment profile is downloaded, the various settings associated with device 104 can be applied. Furthermore, user 106 may see an organization-specific introduction screen displayed on a display of the device, which may provide information on the current device management process and otherwise lock the user out from making alternative changes to the device setup. However, in certain implementations, user 106 may utilize an escape link on the organization-specific introduction screen if the user wishes to reject the auto-configuration of the device, and proceed with a manual setup of the device.

Figure 2:
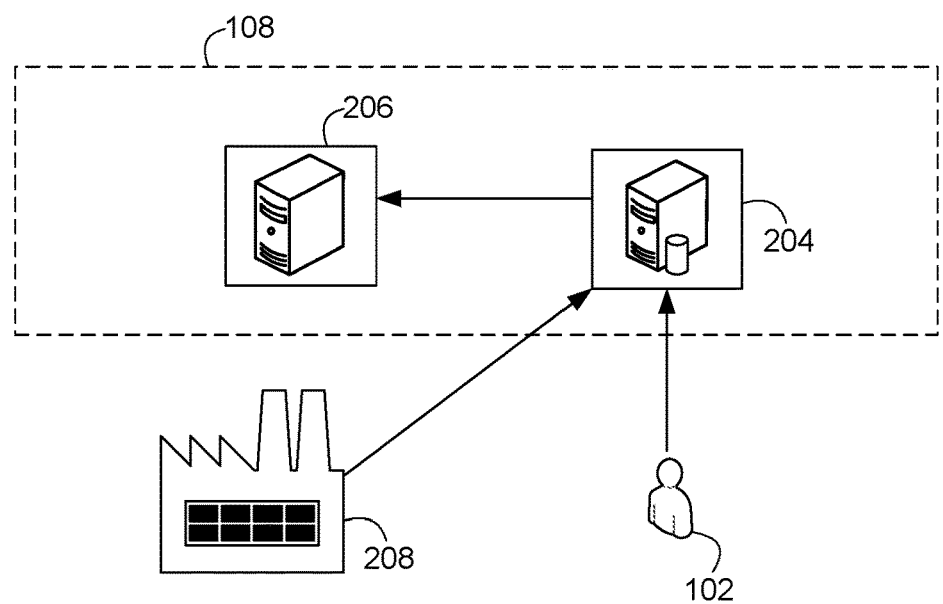
FIGS. 2-5 illustrate example process flows that are consistent with some implementations of the present concepts.

FIG. 2 depicts an example process 200 by which an organization can register a particular device with management server 108 for use with the zero-touch deployment structure. As depicted in FIG. 2, in one implementation, a device may already be built by an OEM, and an IT administrator 102 may have received a CBR from the OEM. In this instance, IT administrator 102 may upload a device ownership claim to management server 108. Management server 108 may include one or more databases and/or directories that can be used for managing device enrollment. For example, management server 108 may include a Device Directory Services (DDS) database 204, and an online directory service 206. In one implementation, IT administrator 102 may directly upload the device ownership claim and the CBR to DDS database 204, where the device ownership claim can comprise a linking of the CBR for a particular device with a management service identifier, such as a tenant ID.

DDS database 204 may then interact with an online directory service 206. In some implementations, online directory service 206 may be a Azure Active Directory, or Amazon Web Services Identity and Access Management, among other identity management software. DDS database 204 may create a record in the online directory service 206, which may include a durable device ID (DDID) that can be utilized to reference the recorded device as defined in the CBR. The DDID can be utilized when the device is powered on to locate the deployment profile associated with the device, as part of the overall attestation and enrollment process for the device, as will be described in greater detail below.

In an alternate implementation, instead of IT administrator 102 uploading a device claim to DDS database 204, an OEM 208 can automatically generate a CBR for a newly-build device and can upload the CBR directly to DDS database 204, along with a management service identifier, in order to automatically associate ownership of the device with the organization that manages the network.

Figure 3:
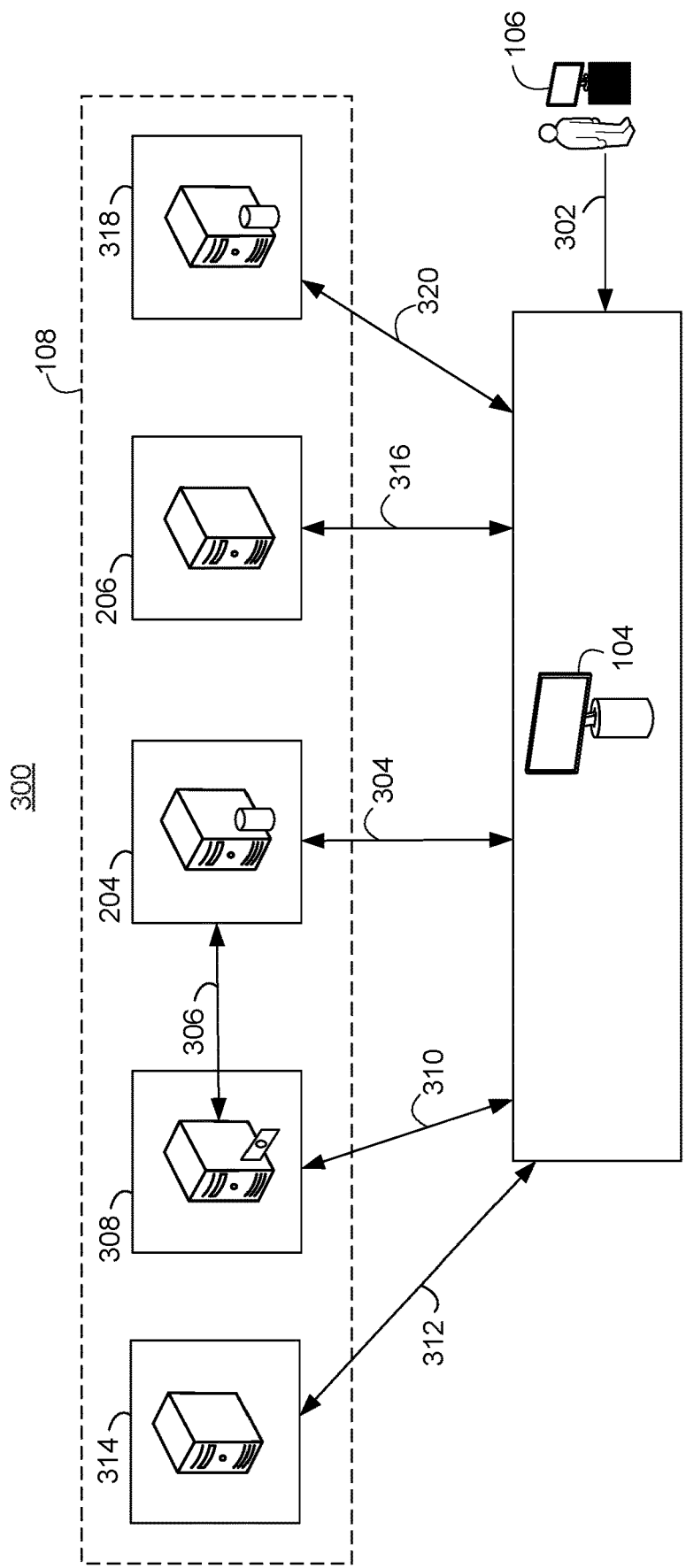

FIG. 3 depicts an example process 300, which illustrates the enrollment process in one implementation, following deployment of the device to the end point. For example, a device 104 may be delivered to a user 106, and at step 302, the device can be unboxed and powered on. In one implementation, device 104 may attempt to automatically determine an available network either by way of a direct wired connection, or by an available public wireless network. Alternatively, a user at the end point who powered on the device may plug the device into a wired network connection, or may select an appropriate wireless network for the kiosk to utilize as a first step of the enrollment process.

Upon determining that network access is available, device 104 may issue a request at step 304 to DDS database 204 to obtain licensing data and a deployment profile that can enable the managed network to configure the device. Step 304 may return licensing data and a deployment profile for use by device 104, based upon DDS database 204 determining that a deployment profile exists corresponding to the DDID associated with device 104. In certain implementations, at step 306, DDS database 204 may request licenses from a licensing server 308, which may acquire licensing data corresponding to the deployment profile associated with the device's DDID. Alternatively, in certain implementations, device 104 may directly issue a licensing request to licensing server 308 as shown at step 310, and licensing server 308 may return licensing data to device 104 based at least upon DDS database 204 determining that a deployment profile exists corresponding to the DDID associated with device 104.

Next, at step 312, device 104 may request a user account to be used for the device based on the DDID. An account repository 314 may be accessed, which can associate account information with the provided DDID and return an account ticket to be used with online directory service 206. The account ticket can have a security flag associated with the ticket, which confirms that the security identifier associated with the DDID matches the security identifier associated with the device's deployment profile. In one implementation, the security identifier may be a TPM.

At step 316, device 104 can send the account ticket to online directory service 206, in order to receive an authentication token to be used with mobile device management (MDM) server 318 for enrolling device 104 in the managed network. Online directory service 206 may verify that the TPM flag associated with the account ticket matches the record stored within the online directory service, based on the enrollment process described in FIG. 2. Upon verifying the TPM flag, online directory service may return a device token for use in authorizing device 104 to MDM server 318.

Finally, at step 320, device 104 may issue the authentication token to MDM server 318, which may validate the token and enroll device 104 in the managed network upon validation of the token.

It is to be appreciated that each of DDS database 204, online directory service 206, licensing server 308, account repository 314, and MDM server 318 may collectively make up management server 108, as the functionality may be performed on a single dedicated server, or spread among the various servers and databases. Furthermore, in certain instances, certain systems and/or databases presented in FIG. 3 may be consolidated with other systems, or may not be necessary. For example, device 104 may simply issue an enrollment request with its DDID to management server 108, and the various processing described in FIG. 3 can be performed by management server 108.

Figure 4:
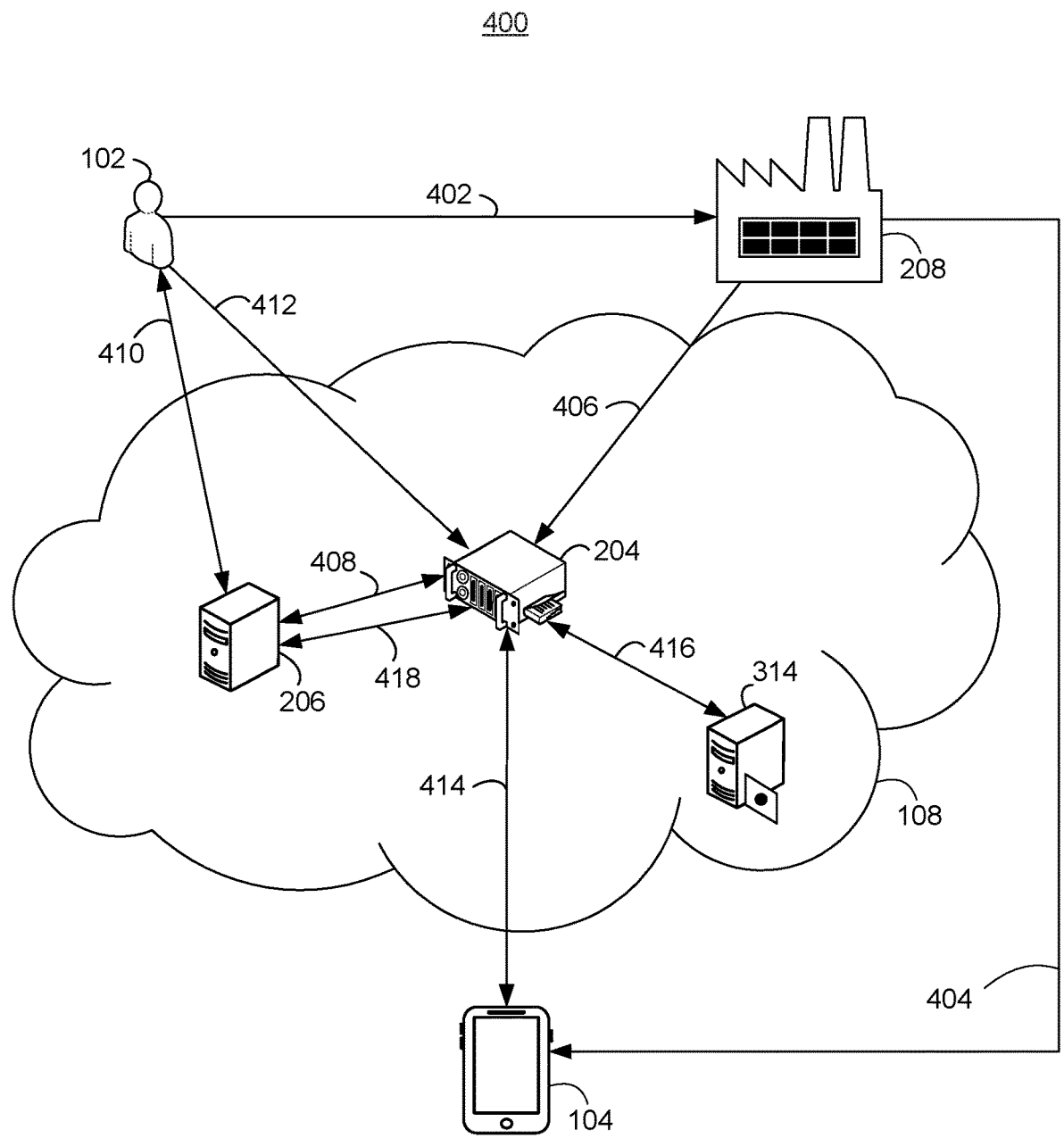

FIG. 4 depicts a process 400, which describes an implementation of the registration and enrollment of a device. At step 402, IT administrator 102 may issue a purchase order for device 104 directly to OEM 208, along with a management service identifier, such as a tenant ID. At step 404, OEM may ship device 104 to the end user. Furthermore, at step 406, OEM can upload a CBR that can be associated with the management service identifier to DDS database 204 in order to create a deployment record corresponding to device 104. At step 408, online directory service 206 can sync with DDS database 204, and at step 410, online directory service 206 can notify IT administrator 102 that a deployment record has been created for device 104. This can enable IT administrator 102 to pre-approve device 104 for access once the device is powered on and properly performs attestation.

In another implementation, instead of or in addition to OEM 208 uploading the CBR to DDS database 204, IT administrator 102 may upload a CBR from a prior order to DDS database 204 in step 412, along with an ownership claim specifying the management service identifier associated with the managed network. For example, OEM 208 may have already fulfilled device orders, and did not have the management service identifier as part of the order. As such, IT administrator 102 can create a new device record at DDS database 204, which can sync with online directory service 206.

Upon powering on of device 104, at step 414, the device may request enrollment in the managed network by providing its DDID to DDS database 204. DDS database 204 may determine an appropriate deployment profile and, in step 416, may interact with account repository 314 to receive appropriate account information for use with online directory service 206. Moreover, at step 418, DDS database 204 may interact with online directory service 206 to verify that the security identifier associated with device 104 matches the information stored in DDS database 204. Specifically, DDS database 204 may confirm that a TPM identifier associated with device 104 matches with a TPM identifier associated with the stored CBR records for the device. Finally, upon determining that the attestation process was successful, DDS database 204 can provide a deployment profile to device 104, which can automatically configure device 104 without additional user involvement.

Figure 5:
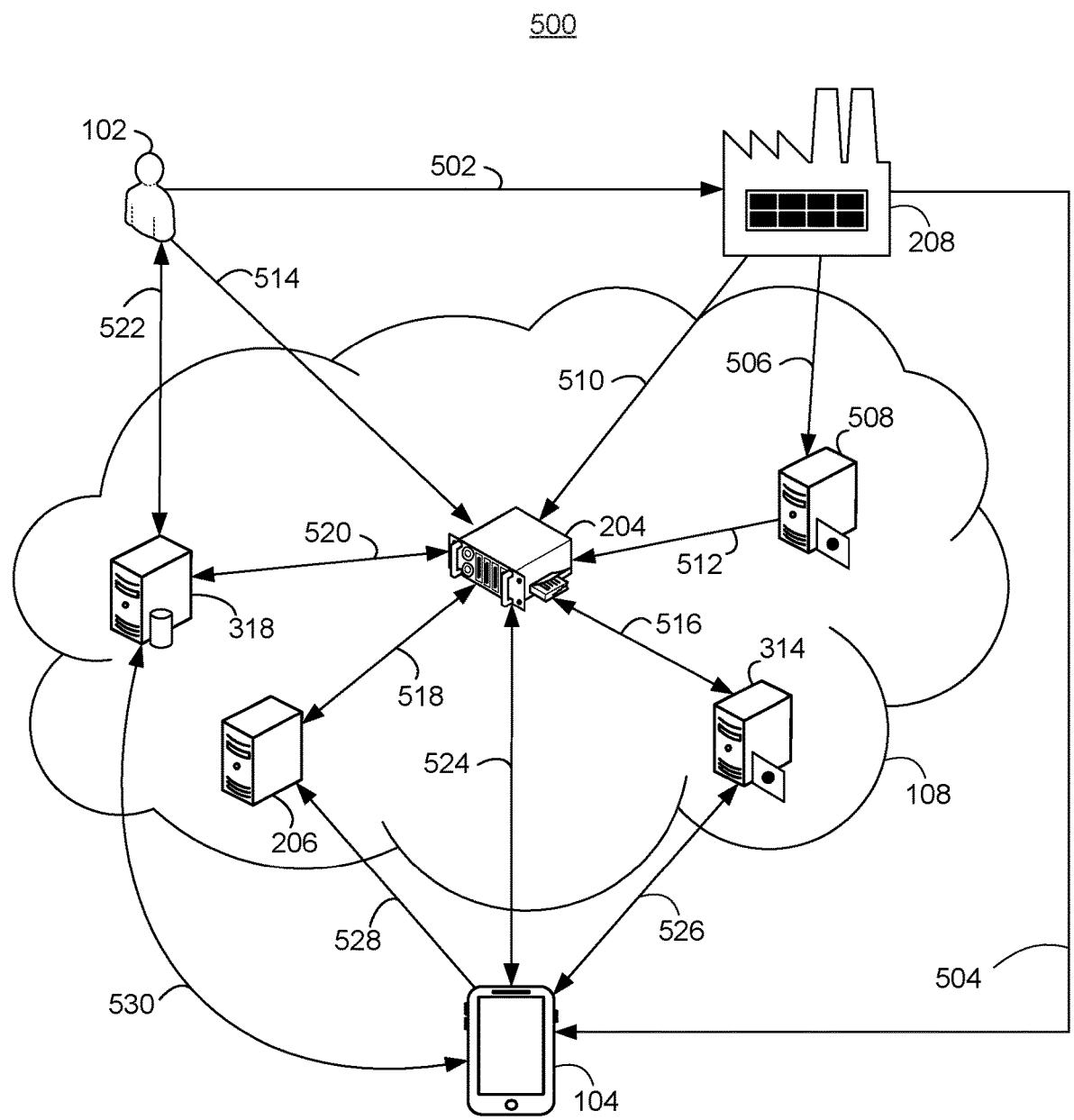

FIG. 5 depicts a process 500, which describes another implementation of the registration and enrollment of a device, similar to process 400 but involving additional processing steps. At step 502, IT administrator 102 may issue a purchase order for device 104 directly to OEM 208, along with a management service identifier, such as a tenant ID. At step 504, OEM 208 may ship device 104 to the end user. Furthermore, at step 506, OEM 208 can upload a CBR associated with device 104 to enterprise server 508, which may be a server that records CBR data for all products produced by the OEM. It is to be appreciated that not every product produced by the OEM may become integrated into the managed network, and as such, in step 510, a sales representative for OEM 208 that processed the order from IT administrator 102 can create a record for any devices that have an associated management service identifier, such as a tenant ID. Thus, when DDS database 204 receives a request to create a record, in step 512, DDS database 204 can retrieve a CBR associated with the particular device and store the device characteristics for use in attestation once the device is powered on.

In another implementation, instead of an OEM sales representative creating a record in DDS database 204, IT administrator 102 may create a record in DDS database 204 based on a prior order in step 514, along with an ownership claim specifying the management service identifier associated with the managed network. The information provided by IT administrator 102 may include device information such as a tuple that may consist of the OEM name, the device model name, and that device serial number, which can be used to uniquely identify a device. As such, utilizing this information, DDS database 204 can retrieve the appropriate CBR from enterprise device 508.

At step 516, the device specification information received from enterprise server 508 can be utilized to create a DDID, which can be linked to account information at account repository 314 for later use when device 104 requests account data.

At step 518, online directory service 206 can sync with DDS database 204, in order to store properties associated with device 104, such as a network domain to join the device to, the management service identifier, the security identifier, and/or the DDID. Furthermore, at step 520, DDS Database 204 can specify new device information to MDM server 318, which in turn can notify IT administrator 102 that a deployment record has been created for device 104. This can enable IT administrator 102 to pre-approve device 104 for access once the device is powered on and properly performs attestation.

Upon powering on of device 104, at step 524, the device may request enrollment in the managed network by providing its DDID to DDS database 204. DDS database 204 may determine an appropriate deployment profile for device 104 and provide licensing information and the deployment profile to device 104. At step 526, device 104 may utilize the received information to request an account ticket from account repository 314. Upon attestation of the account information, account repository 314 may return an account ticket to device 10. The account ticket can have a security flag associated with the ticket, which confirms that the security identifier associated with the DDID matches the security identifier associated with the device's deployment profile.

Next, at step 528, device 104 may provide the account ticket to online directory service 206 in order to verify that the security identifier associated with device 104 matches the information stored in DDS database 204. Upon verifying that the account ticket is valid, online directory service 206 can issue a device token to device 104. Finally, at step 530, device 104 may provide the device token to MDM server 318, which may validate the token and enroll device 104 in the managed network upon validation of the token. Furthermore, MDM server 318 may issue various bootstrap settings and policies consistent with the managed network, which can be used to automatically configure device 104 without additional user involvement.

Example System

Figure 6:
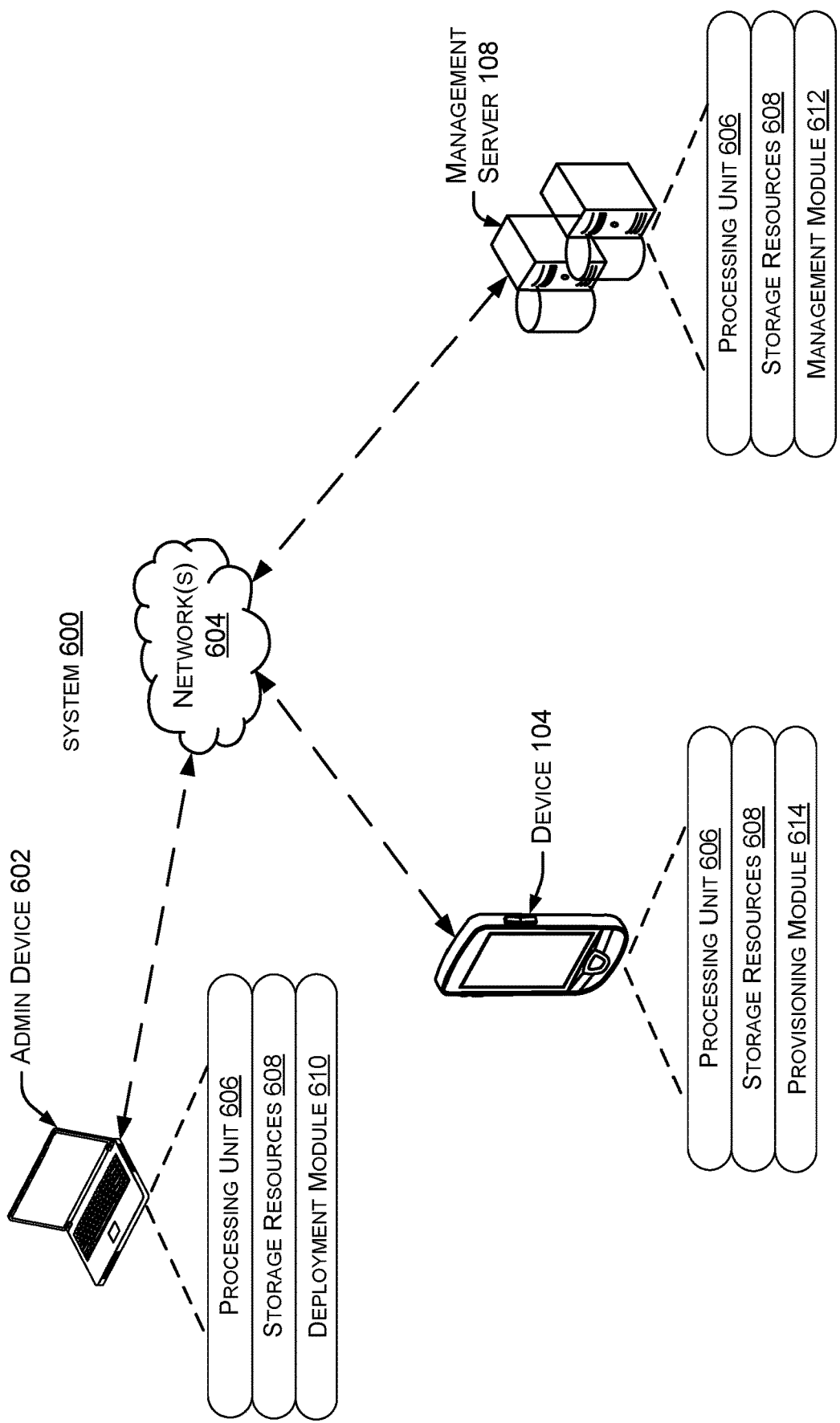
FIG. 6 illustrates an example system, consistent with some implementations of the present concepts.

The present implementations can be performed in various scenarios on various devices. FIG. 6 shows an example system 600 in which the present implementations can be employed, as discussed more below.

As shown in FIG. 6, system 600 can include an admin device 602, management server 108, and one or more devices 104 that are for deployment. Each of the above devices may be connected by one or more network(s) 604, which may be a LAN, WAN, or any other such type of network. Note that either admin device 602 and/or device 104 can be embodied both as mobile devices such as smart phones or tablets, as well as stationary devices such as desktops, server devices, stand-alone kiosks, etc. Likewise, management server 108 can be implemented using various types of computing devices. In some cases, any of the devices shown in FIG. 6, but particularly the servers, can be implemented in data centers, server farms, etc.

Generally, the devices 104, 108, and 602 may have respective processing units 606 and storage resources 608, which are discussed in more detail below. The devices may also have various modules that function using the processing units and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing units for execution.

Admin device 602 can be utilized by, for example, IT administrator 102 to create deployment profiles utilizing a deployment module 610 that can interact with a management module 612 on management server 108. Generally speaking, the deployment module can provide certain configuration parameters to the management modules, and may associate certain deployment profiles with particular device ID to be used in provisioning the devices upon powering on. The configuration parameters can include system configuration settings, as well as policy restrictions and requirements that may be controlled according to management module 612.

Management module 612 can further be used in attesting information that is received from device 104, such as by attesting a security identifier corresponds to recorded information that may be associated with device 104. Management module 612 can then confirm enrollment of device 104 and provide the specific deployment profile that is to be associated with the device. The deployment profile can then be utilized by a provisioning module 614 that may operate on device 104, which can provision the shared device according to the instructions provided in the deployment profile.

Device Implementations

As noted with respect to FIG. 6 system 600 may include several components and/or devices, including device 104, management server 108, and admin device 602. However, not all device implementations can be illustrated, and other device implementations should be apparent to the skilled artisan from the description above and below.

The term "device", "computer," "computing device," "client device," "server," and or "server device" as possibly used herein can mean any type of device that has some amount of hardware processing capability and/or hardware storage/memory capability. Processing capability can be provided by one or more hardware processor units (e.g., hardware processing units/cores) that can execute computer-readable instructions to provide functionality. Computer-readable instructions and/or data can be stored on persistent storage or volatile memory. The term "system" as used herein can refer to a single device, multiple devices, etc.

Storage resources can be internal or external to any respective devices with which it is associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others, which may the storage resources.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that the components and/or devices described herein can function in a stand-alone or cooperative manner to implement the described techniques. For example, the methods described herein can be performed on a single computing device and/or distributed across multiple computing devices that communicate over one or more network(s). Without limitation, such one or more network(s) can include one or more local area networks (LANs), wide area networks (WANs), the Internet, and the like.

Example Automatic Configuration Method

Figure 7:
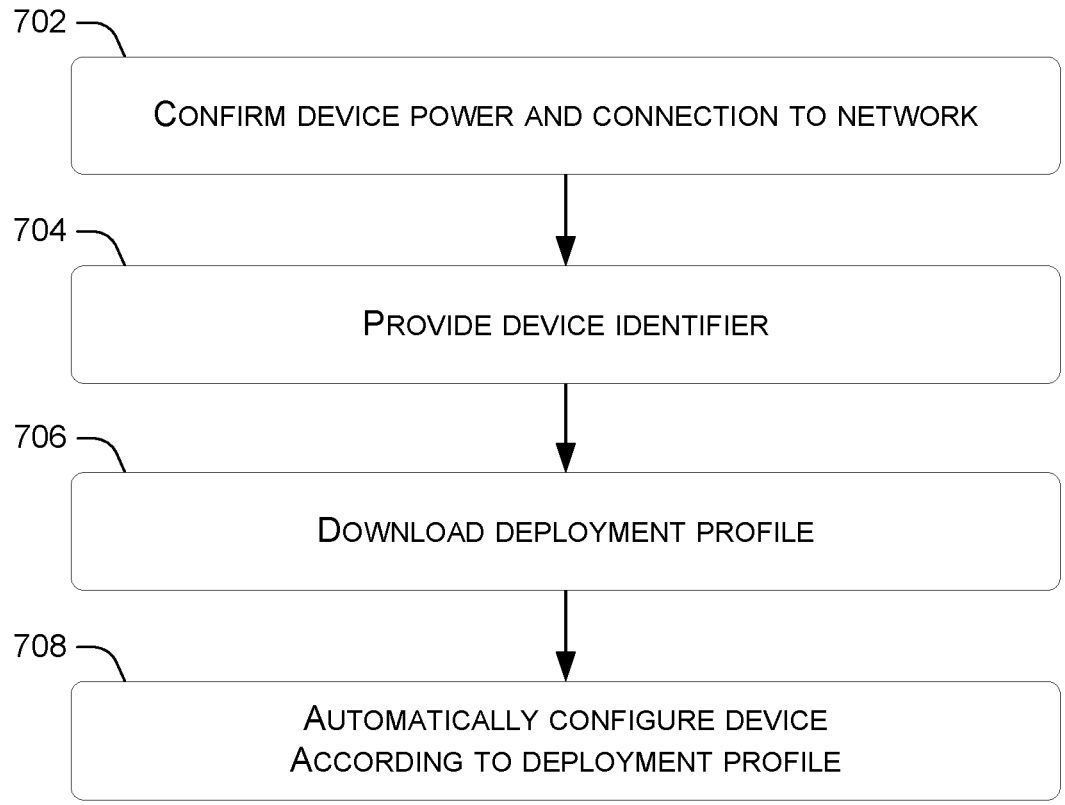
FIG. 7 illustrates an example method or technique that is consistent with some implementations of the present concepts.

The following discussion presents an overview of automatic deployment and configuration functionality described above. FIG. 7 illustrates an example method 700, consistent with the present concepts. Method 700 can be implemented by a single device, e.g., admin device 602, or various steps can be distributed over one or more servers, client devices, etc. Moreover, method 700 can be performed by one or more components or modules associated with any of admin device 602, management server 108, and/or device 104.

At block 702, a shared device may be powered on, and the device may confirm that the full power on has been completed and that the device has access to a network connection. For example, the device may determine whether there is a current public wireless signal that can be utilized, or whether the device is connected to the Internet via an Ethernet cable.

At block 704, the device may provide a device identifier to a server for use in obtaining a deployment profile. Such a device identifier may uniquely identify the device, and in some implementations, may be associated with a TPM that uniquely identifies the device.

At step 706, the shared device may download a deployment profile that is associated with the device identifier. In some implementations, the deployment profile may specify mobile device management policy settings, along with standard configuration settings for the shared device, such as a default language, keyboard settings, and personal assistant settings.

Finally, at step 708, the shared device may utilize the deployment profile to automatically configure the device according to the settings provided in the deployment profile. In certain implementations, the shared device can perform the configuration without requiring any involvement by a user of the device, as the deployment profile may specify organizational data associated with the organization that created the deployment profile, along with default settings that can fully configure the shared device for use by the user. Thus, the shared device can be configured without requiring any particular IT expertise by an end user.

Various examples are described above. Additional examples are described below. One example includes a device comprising a hardware processing unit and a storage resource storing computer-readable instructions that, when executed by the hardware processing unit, cause the hardware processing unit to: detect an initial powering on of the device, determine that the device is connected to a network, provide, to a database, a security identifier associated with the device upon determining that the device is connected to the network, download, from the database, a deployment profile containing configuration settings for the device when the security identifier matches a security identifier stored in the database, and automatically configure the device according to the configuration settings without requiring a user of the device to enter any configuration settings.

Another example can include any of the above and/or below examples where the deployment profile is created by an administrator associated with an organization.

Another example can include any of the above and/or below examples where the deployment profile defines mobile device management policy settings to be applied to the device.

Another example can include any of the above and/or below examples where the device further comprises displaying, on a display of the device, an information screen that lists information associated with the organization, and current configuration settings being applied to the device.

Another example can include any of the above and/or below examples where the security identifier is associated with a trusted platform module associated with the device.

Another example can include any of the above and/or below examples where the security identifier stored in the database is from a computer build report.

Another example can include any of the above and/or below examples where the computer build report is uploaded to the database from an original equipment manufacturer.

Another example can include any of the above and/or below examples where the user of the device can reject the automatic configuration of the device.

Another example can include any of the above and/or below examples where the device further comprises displaying a standard setup screen on a display of the device when the user rejects the automatic configuration of the device.

Another example includes a method comprising providing a device identifier associated with a device to a server, the device identifier uniquely identifying the device, downloading, from the server, a deployment profile that provides configuration settings for configuring the device, and automatically configuring the device using the configuration settings without requiring intervention by a user of the device.

Another example can include any of the above and/or below examples where the device identifier is associated with a trusted platform module associated with the device.

Another example can include any of the above and/or below examples where the deployment profile defines mobile device management policy settings to be applied to the device.

Another example can include any of the above and/or below examples where the deployment profile is automatically downloaded upon initial powering on of the device.

Another example includes a system comprising a hardware processing unit and a storage resource storing computer-readable instructions that, when executed by the hardware processing unit, cause the hardware processing unit to: provide a management service identifier to an equipment manufacturer, the management service identifier being associated with a deployable device made by the equipment manufacturer prior to delivery of the deployable device and specify a deployment profile for the deployable device, the deployment profile providing configuration settings for automatically configuring the deployable device upon initial powering on of the deployable device without requiring a user of the deployable device to configure settings on the deployable device, where the management service identifier is associated with the deployment profile, and the deployment profile is automatically downloaded to the deployable device upon attestation of a security identifier associated with the deployable device.

Another example can include any of the above and/or below examples where the security identifier is associated with a trusted platform module associated with the deployable device.

Another example can include any of the above and/or below examples where the deployment profile defines mobile device management policy settings to be applied to the deployable device.

Another example can include any of the above and/or below examples where the deployment profile is created prior to deployment of the deployable device.

Another example can include any of the above and/or below examples where attestation of the security identifier is based at least on comparison of the security identifier associated with the deployable device and information received from the equipment manufacturer regarding the deployable device.

Another example can include any of the above and/or below examples where the information received from the equipment manufacturer regarding the deployable device is a computer build report.

Another example can include any of the above and/or below examples where the management service identifier is associated with the deployable device according to a record in a database that links the management service identifier to information from the computer build report.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A device comprising:
a trusted security chip;
a hardware processing unit; and
a storage resource storing computer-readable instructions that, when executed by the hardware processing unit, cause the hardware processing unit to:
detect an initial powering on of the device;
provide, over a public network to a network-accessible database, a security identifier associated with the trusted security chip of the device;
download, over the public network from the network-accessible database, a deployment profile comprising network configuration settings for the device, the network configuration settings relating to a managed network in which the device has been pre-registered prior to the initial powering on of the device; and
automatically configure the device for network access to the managed network according to the network configuration settings.

2. The device of claim 1, wherein the public network is the Internet, and the device cannot access the managed network until the deployment profile is downloaded over the Internet.

3. The device of claim 1, wherein the deployment profile defines mobile device management policy settings to be applied to the device.

4. The device of claim 1, wherein the computer-readable instructions, when executed by the hardware processing unit, cause the hardware processing unit to:
display, on a display of the device, an information screen that lists the network configuration settings.

5. The device of claim 1, wherein the trusted security chip comprises a trusted platform module.

6. The device of claim 1, wherein the security identifier matches another security identifier stored in the network-accessible database, the another security identifier being derived from a computer build report.

7. The device of claim 1, wherein the device is automatically configured for network access without requiring a user of the device to enter any configuration settings.

8. The device of claim 1, wherein the computer-readable instructions, when executed by the hardware processing unit, cause the hardware processing unit to:
reject the automatic configuration of the device responsive to user input.

9. The device of claim 8, wherein the computer-readable instructions, when executed by the hardware processing unit, cause the hardware processing unit to:
display a standard setup screen on a display of the device responsive to the user input rejecting the automatic configuration of the device.

10. A method comprising:
detecting an initial powering on of a device;
providing a device identifier associated with a trusted security chip of the device to a network-accessible server over a public network, the device identifier uniquely identifying the device;
downloading, over the public network from the network-accessible server, a deployment profile that provides configuration settings for configuring the device, the configuration settings relating to a managed network in which the device has been pre-registered prior to the initial powering on of the device; and
automatically configuring the device to access the managed network using the configuration settings.

11. The method of claim 10, wherein the trusted security chip comprises a trusted platform module of the device.

12. The method of claim 10, wherein the deployment profile defines mobile device management policy settings to be applied to the device.

13. The method of claim 10, wherein the deployment profile is automatically downloaded over the Internet upon initial powering on of the device.

14. A system comprising:
a hardware processing unit; and
a storage resource storing computer-readable instructions that, when executed by the hardware processing unit, cause the hardware processing unit to:
provide a management service identifier to an equipment manufacturer, the management service identifier being associated with a deployable device made by the equipment manufacturer prior to delivery of the deployable device; and
specify a deployment profile for the deployable device, the deployment profile providing configuration settings for automatically configuring the deployable device to access a managed network upon initial powering on of the deployable device, the deployable device having been pre-registered in the managed network prior to the initial powering on,
wherein the management service identifier is associated with the deployment profile, and the deployment profile is automatically downloaded over a public network to the deployable device upon attestation of a security identifier associated with a trusted security chip of the deployable device.

15. The system of claim 14, wherein the trusted security chip comprises a trusted platform module associated with the deployable device.

16. The system of claim 14, wherein the deployment profile defines mobile device management policy settings to be applied to the deployable device.

17. The system of claim 16, wherein the deployment profile is created prior to deployment of the deployable device.

18. The system of claim 14, wherein attestation of the security identifier is based at least on comparison of the security identifier associated with the trusted security chip of the deployable device and information received from the equipment manufacturer regarding the deployable device.

19. The system of claim 18, wherein the information received from the equipment manufacturer regarding the deployable device is a computer build report.

20. The system of claim 19, wherein the management service identifier is associated with the deployable device according to a record in a database that links the management service identifier to information from the computer build report.

* * * * *